United States Patent [19]

Komatsuki

[11] Patent Number: 5,551,498
[45] Date of Patent: Sep. 3, 1996

[54] PNEUMATIC TIRE WITH HYBRID STEEL/ARAMID BELT CORD

[75] Inventor: Masato Komatsuki, Takasago, Japan

[73] Assignee: Sumitomo Rubber Industries, Ltd., Hyogo-ken, Japan

[21] Appl. No.: 223,108

[22] Filed: Apr. 5, 1994

[30] Foreign Application Priority Data

Apr. 21, 1993 [JP] Japan ................... 5-118956

[51] Int. Cl.$^6$ .................... B60C 9/00; B60C 9/18; B60C 9/20
[52] U.S. Cl. .................... 152/527; 57/902; 152/451
[58] Field of Search ............... 57/211–212, 222–223, 57/232, 234, 902; 152/451, 527, 536

[56] References Cited

U.S. PATENT DOCUMENTS 4,878,343  11/1989  Weidenhaupt et al. ............... 57/902 X

FOREIGN PATENT DOCUMENTS

| 0293263 | 11/1988 | European Pat. Off. . |
| 2338152 | 8/1977 | France . |
| 2476548 | 8/1981 | France . |

OTHER PUBLICATIONS

Research Disclosure No. 15955, Jul. 1977, pp. 53–54 Havant, GB.
*Mechanics of Pneumatic Tires*, ed. Samuel Clark: US Dept. of Transportation, Aug. 1981, pp. 207–220.

Primary Examiner—Adrienne C. Johnstone
Attorney, Agent, or Firm—Birch, Stewart, Kolasch & Birch, LLP

[57] ABSTRACT

A pneumatic tire which comprises a carcass turned up around bead cores and a belt comprising a ply of parallel hybrid cords disposed radially outside the carcass. Each hybrid cord comprises at least one aramid strand and at least one steel strand which are twisted together. The aramid strand is made of aramid fiber filaments twisted together, and the steel strand is made of a steel monofilament.

5 Claims, 4 Drawing Sheets

PNEUMATIC TIRE WITH HYBRID STEEL/ARAMID BELT CORD

BACKGROUND OF THE INVENTION

The present invention relates to a pneumatic tire, the weight of which is reduced with the steering stability and flow noise nature being maintained.

In order to reinforce the tread portion of a tire, it has been proposed to use a belt made of aramid cords. However, if only the aramid cord belt is disposed in the tread portion, the tire can not be provided with a sufficient rigidity because the aramid cords are weak in compressive stress in contrast with their very high tensile modulus and light-weight nature. As a result, the aramid belt tire is inferior in steering stability to a steel belt tire.

Further, due to the decreased tread rigidity, deformation and vibration of the tire are liable to occur during running, which results in increased tire noise.

As a countermeasure for such decreased tread rigidity it has been proposed to provide a steel cord belt together with an aramid cord belt. In this measure, however, the belt thickness is inevitably increased, and the tire weight is correspondingly increased.

It is therefore, an object of the present invention to provide a pneumatic tire, in which the tire weight is reduced, with the tread rigidity being maintained.

SUMMARY OF THE INVENTION

According to the present invention, a pneumatic tire comprises a toroidal carcass extending between bead portions and turned up around bead cores and a belt disposed radially outside the carcass and inside a tread portion, the belt comprising at least one ply of hybrid cords laid parallel to each other, each hybrid cord comprising at least one aramid strand and at least one steel strand, the aramid strand being made of aramid fibers, and the steel strand being made of a steel monofilament.

Preferably, the total denier of all the aramid fibers in each hybrid cord is in the range of from 800 to 4000 deniers, and the diameter of each steel filament is in the range of from 0.17 to 0.35 mm.

Therefore, when the hybrid cord is subjected to a compressive force, the force is shared with the steel strand, and the tread rigidity and cord strength in the direction of the compressive force are improved.

BRIEF DESCRIPTION OF THE DRAWINGS

Embodiments of the present invention will now be described in detail in conjunction with the accompanying drawings, wherein.

DESCRIPTION OF THE PREFERRED EMBODIMENTS

Figure 1:
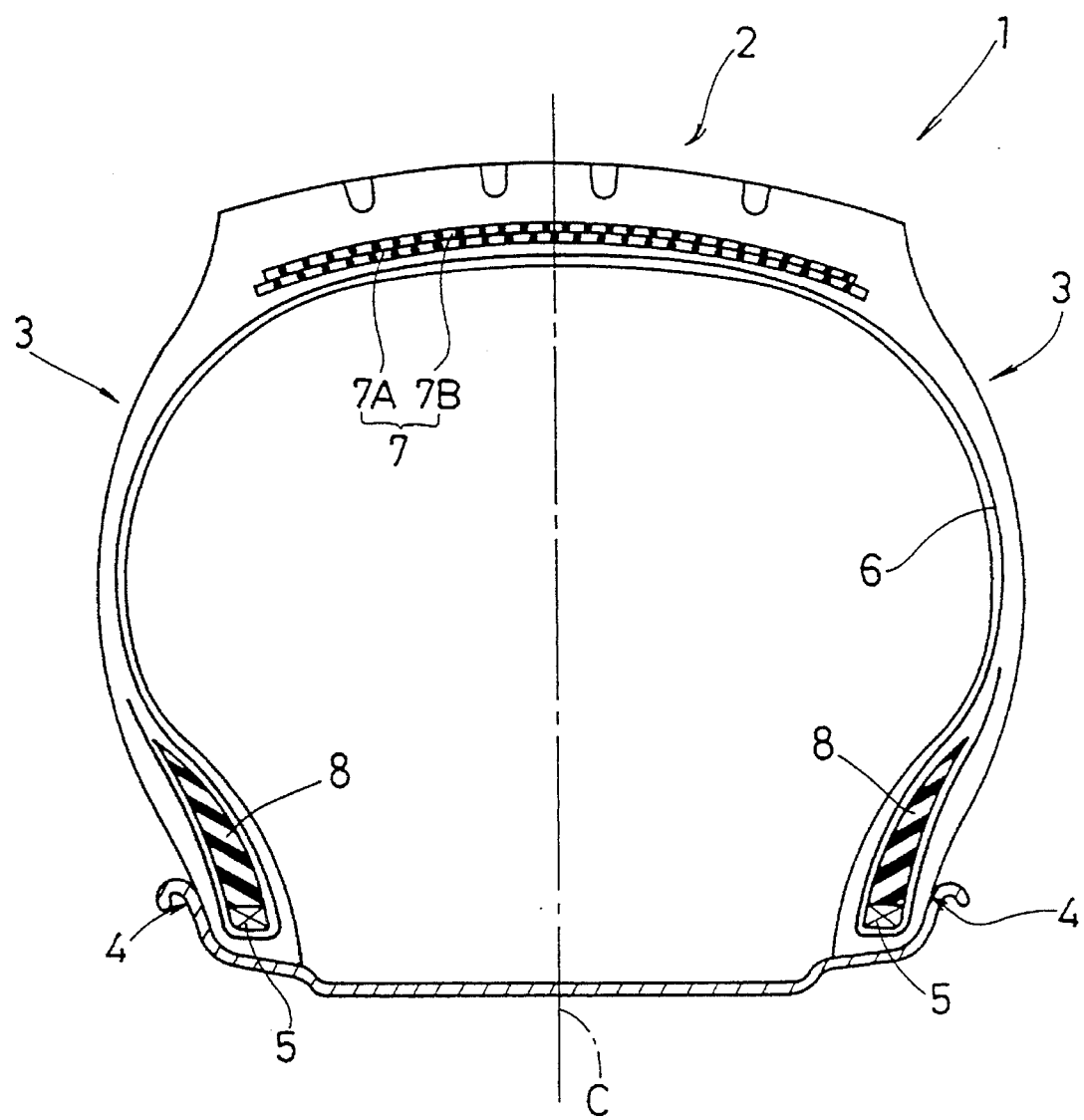
FIG.1 is a cross sectional view of a tire according to the present invention.
Figure 2:
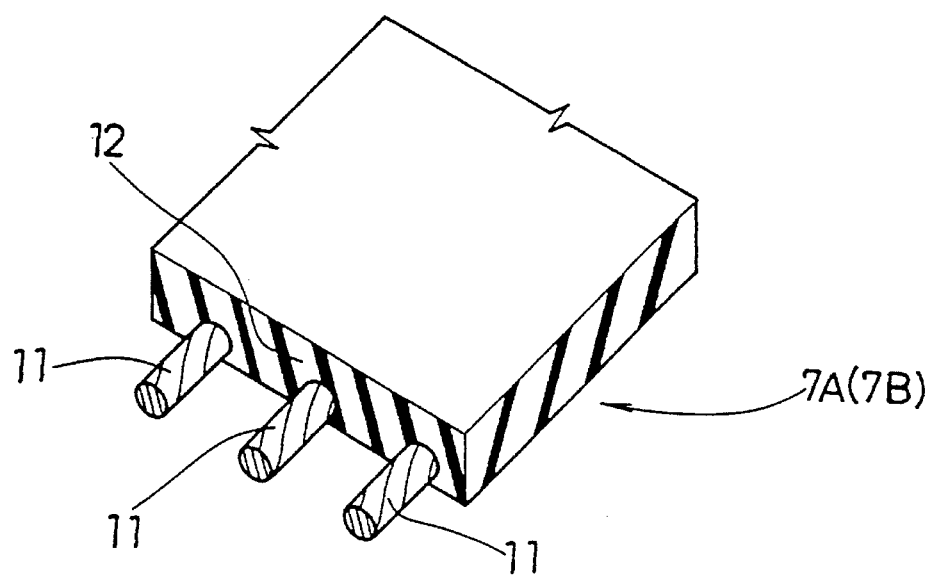
FIG.2 is a partial perspective view of the belt ply thereof.

In FIG.1 and FIG.2, the pneumatic tire 1 comprises a tread portion 2, a pair of axially spaced bead portions 4, a pair of sidewall portions 3 extending between the tread edges and the bead portions, a pair of bead cores 5 disposed one in each of the bead portions 4, a carcass 6 extending between the bead portions 4, and a belt 7 disposed radially outside the carcass 6 and inside the rubber tread.

The carcass 6 comprises at least one radial or semiradial carcass ply of radially arranged cords extending between the bead portions through the sidewall portions and the tread portion and being turned up around the bead cores 5 from the axially inside to the outside thereof to form two turned up portion and one main portion therebetween.

In this embodiment, the carcass 6 consists of a single ply of organic fiber cords, e.g. nylon, polyester, rayon, aramid and the like, arranged at an angle of 70 to 90 degrees with respect to the tire equator C.

Between the carcass main portion and each turned up portion, a bead apex 8 is disposed. The bead apex 8 is made of hard rubber extending radially outwardly and tapering From the bead core 5.

The belt 7 comprises two cross plies, in this embodiment only two cross breaker plies 7A and 7B, of parallel cords 11 coated with topping rubber 12.

Each of the belt cords 11 is a hybrid cord composed of at least one aramid strand 13 and at least one steel strand 14.

Each steel strand 14 consists of a steel monofilament having a diameter in the range of from 0.17 to 0.35 mm.

Each aramid strand 13 is composed of one or more yarns 15. The yarn is a bunch of aramid fiber filaments which are twisted together.

The total denier number of all the aramid fiber Filaments in one cord is in the range of from 800 to 4000.

If the diameter of the steel filament 14 is less than 0.17 mm, the strength of the belt cord decreases and the tread rigidity is decreased causing deterioration in the steering stability. If the diameter is more than 0.35 mm, the diameter of the belt cord becomes large, and the tire weight is increased to deteriorate the steering stability and ride comfort.

If the total denier number is less than 800, the belt rigidity is decreased and the steering stability is deteriorated. Further, the tire noise is liable to increase. If the total denier number is more than 4000, the diameter of the belt cord becomes large, and the resultant belt ply becomes thick. As a result, the tire weight is increased. Further, the tread rigidity is liable to be excessively increased which causes the steering stability to deteriorate.

Further, when a plurality of steel strands 14 are used, the twisting pitch TWP therefor is preferably set in the range of 9.5 to 18 mm.

On the other hand, the twist number TWN for the aramid strand(s) 13 is preferably set in the range of 10 to 50 turn/10 cm.

In this tire embodiment, the cord 11 is composed of a plurality of aramid strands 13 and a plurality of steel strands 14.

In each belt ply, the count of the belt cords 11 is preferably in the range of from 30 to 40 ends/5 cm.

On the other hand, organic fibers usually have humidity. Therefore, the steel filaments being twisted with such organic fibers are likely to become rusted even when embedded in rubber. Therefore, in order to prevent such rust, each aramid fiber filament is preferably resin-coated, for example, by dipping the filament in epoxy resin firstly and resorcinol-formalaldehyde latex secondary. Due to the resin coat, the transfer of humidity from the aramid strand to the steel strand is hindered, and further the rigidity of the aramid strand is increased to further improve the steering stability and noise.

Figure 3:
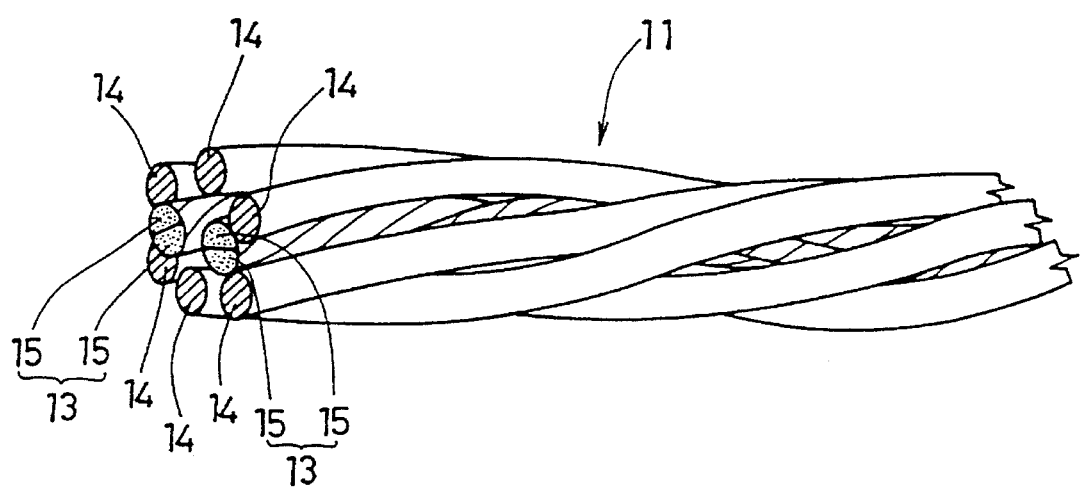
FIG.3 is a perspective view showing an example of the belt cord.
Figure 4:
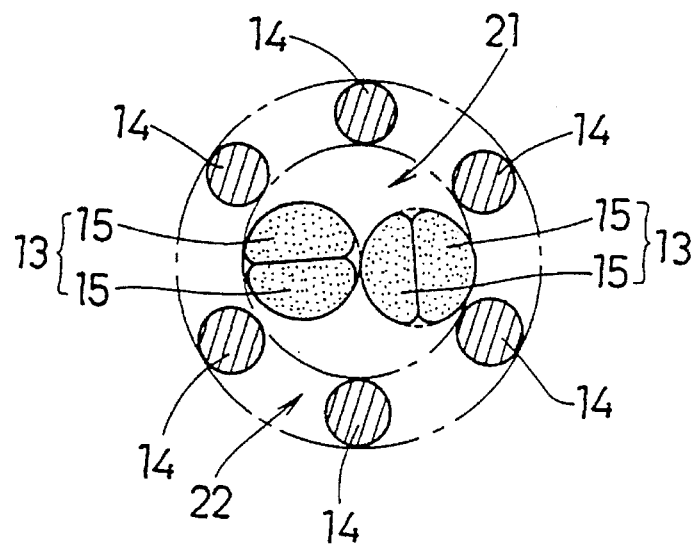
FIG.4 is a cross sectional view thereof.

FIGS. 3 and 4 show an example of the belt cord 11. In this example, the belt cord 11 consists of a core 21 consisting of two aramid strands 13 twisted together and a outer layer 22 called "sheath" consisting of six steel strands 14 or filaments surrounding the core 21, whereby the cord has a so-called "2+6" construction. In this example cord, each of the aramid strands 13 consists of two yarns 15 twisted together. The number of the aramid fiber filaments in each yarn is in the range of from 150 to 250, and the total denier number in each strand is in the range of from 400 to 2000.

The aramid fiber filaments are firstly twisted in, for example, a Z-direction to form a yarn 15, and two yarns 15 are secondly twisted in the reverse S-direction to form a strand 13. Then two strands 13 are thirdly twisted in the Z-direction to form a core 21. Further, six steel strands 14 are fourthly twisted around the core 21 in the S-direction. The directions of the first to fourth twists can be reversed thereto.

As mentioned above, the number TWN of each of the first to third twists is in the range of 10 to 50 turn/10 cm (in this example 35 turn/10 cm). The twisting pitch TWP for the steel strands 14 is in the range of 9.5 to 16 mm.

Figure 5:
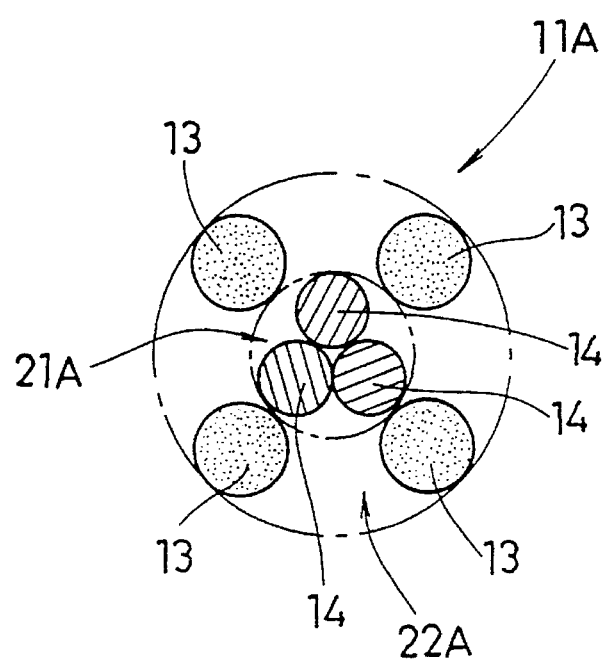
FIGS. 5 and 6 are cross sectional views each showing another example of the belt cord.

FIG. 5 shows another example of the belt cord. In this example, the cord 11A consists of a core 21A consisting of three steel strands 14 and an outer layer 22A consisting of four aramid strands 13 surrounding the core 21A, whereby the cord 1A has a "3+4" construction.

In this example cord, each of the aramid strands 13 consists of a single yarn.

The steel strands 14 are firstly twisted in, for example, a Z-direction to form the core 21A. On the other hand, aramid fiber filaments are secondly twisted in the Z-direction to form a strand 13, and then four aramid strands 13 are thirdly twisted around the core 21A in the S-direction.

The twisting pitch TWP of the first twist for the steel strands 14 is in the range of 9.5 to 16 mm. The number TWN of each of the second to third twists is in the range of 10 to 50 turn/10 cm.

Figure 6:
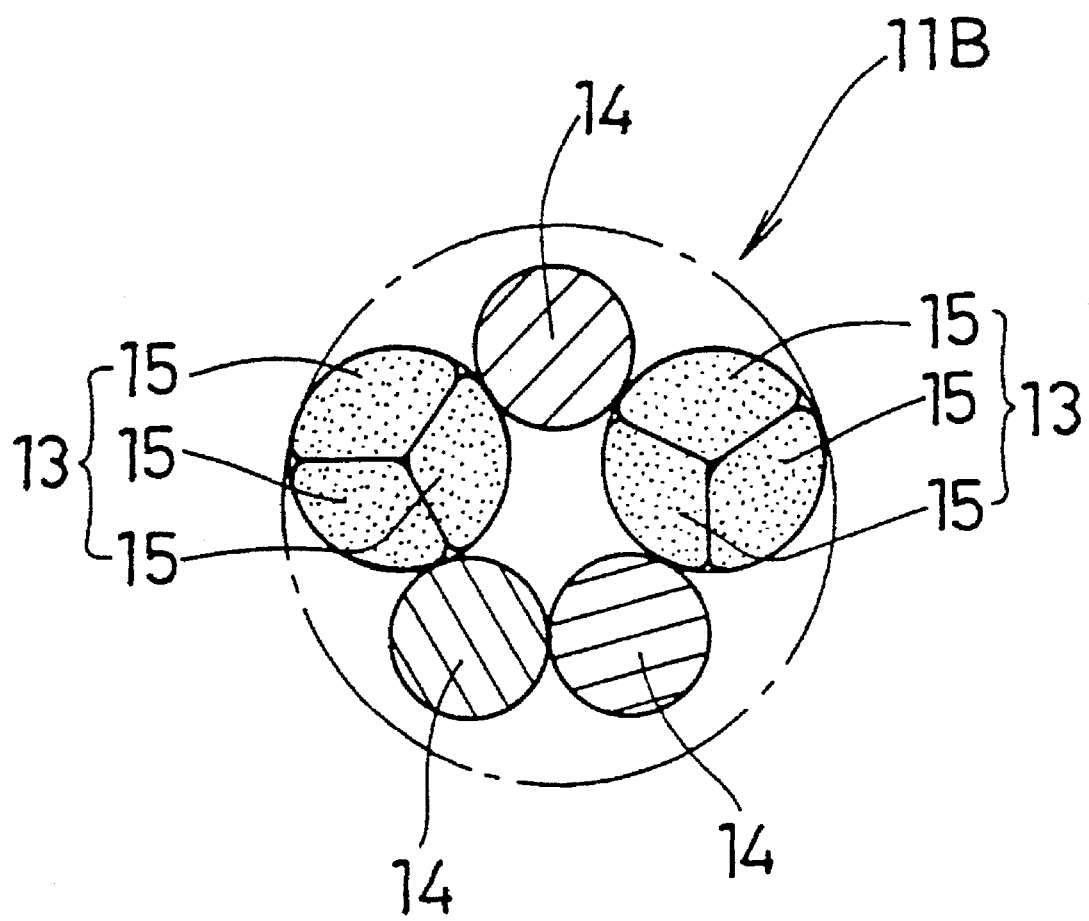

FIG.6 shows still another example of the belt cord. In this example, the cord 11b consists of two aramid strands 13 and three steel strands 14, which are twisted together so as to have a "1×5" construction.

In this example, each of the aramid strands 13 consists of three yarns 15 twisted together.

Aramid fiber filaments are firstly twisted in, for example, a Z-direction to form a yarn 15, and three yarns 15 are secondly twisted in the reverse S-direction to form a strand 13. Then two aramid strands 13 and three steel strands 14 are thirdly twisted together in a cord in the Z-direction.

The number TWN of each of the first to second twists is in the range of 10 to 50 turn/10cm. The twisting pitch TWP of the third twist for the steel strands 14 and also aramid strand 13 is in the range of 9.5 to 16 mm.

Test tires of size 195/70R14 having the same tire construction shown in FIG.1 were made and tested for the Following performances. The cord specifications and the test results are shown in Table 1.

1) Steering stability and Ride comfort

Running a test car on a test course, the steering stability and ride comfort of the test tires were evaluated into five ranks by a test driver, wherein the rank for the reference tire 1 is three, and the larger the value, the better the performance.

2) Tire noise

Running a test car at a running (coasting) speed of 60 km/h, the maximum noise sound level was measured according to the "Test Procedure for Tire Noise" specified in JASOC606. The results are indicated by an index based on the reference tire 1 being 100. The larger the index, the better or smaller the tire noise.

Throughout the tests, it was confirmed that in the Example tires, especially Example tire 2, the tire weight could be effectively reduced, maintaining the other performances at good levels.

TABLE 1

| Tire | Ex. 1 | Ex. 2 | Ex. 3 | Ex. 4 | Ex. 5 |
|---|---|---|---|---|---|
| Cord construction | 2 + 6 | 2 + 4 | 2 + 2 | 2 + 6 | 2 + 2 |
| Core *1 | A | A | A | A | A |
| Outer layer *1 | S | S | S | S | S |
| Aramid strand denier/no. | 1000/2 | 1000/2 | 1000/2 | 1000/2 | 1000/2 |
| Total denier | 2000 | 2000 | 2000 | 2000 | 2000 |
| Steel strand dia. (mm)/no. | 0.175/6 | 0.22/4 | 0.32/2 | 0.15/6 | 0.38/2 |
| Cord strength (N) | 600 | 620 | 650 | 540 | 700 |
| Cord count (ends/5 cm) | 35 | 35 | 35 | 35 | 35 |
| Test result | | | | | |
| Tire weight (kg) | 8.2 | 8.3 | 8.6 | 8.1 | 8.6 |
| Steering stability | 2.9 | 3.0 | 3.1 | 2.7 | 2.8 |
| Ride comfort | 3.2 | 3.1 | 2.9 | 3.2 | 2.7 |
| Tire noise | 96 | 100 | 102 | 94 | 105 |

| Tire | Ex. 6 | Ex. 7 | Ex. 8 | Ref. 1 | Ref. 2 |
|---|---|---|---|---|---|
| Cord construction | 2 + 4 | 3 + 4 | 1 + 2 | 1 × 5 | (1 × 2) |
| Core *1 | A | A | S | — | — |
| Outer layer *1 | S | S | A | — | — |
| Aramid strand denier/no. | 380/2 | 1500/3 | 1000/2 | — | 1500/2 |
| Total denier | 760 | 4500 | 2000 | | 3000 |
| Steel strand dia. (mm)/no. | 0.22/4 | 0.22/4 | 0.25/1 | 0.25/5 | — |
| Cord strength (N) | 560 | 670 | 510 | 640 | 500 |
| Cord count (ends/5 cm) | 35 | 35 | 50 | 35 | 55 |
| Test result | | | | | |
| Tire weight (kg) | 8.2 | 8.6 | 7.9 | 8.7 | 7.7 |
| Steering stability | 2.7 | 3.0 | 2.7 | 3.0 | 2.6 |
| Ride comfort | 3.1 | 2.9 | 3.0 | 3.0 | 3.1 |
| Tire noise | 97 | 104 | 93 | 100 | 90 |

*1) A = Aramid,
S = Steel

I claim:

1. A pneumatic tire comprising
a pair of bead cores each disposed in a bead portion,
a toroidal carcass extending between the bead portions and turned up around said pair of bead cores, and
a belt disposed radially outside the carcass and inside a tread portion,
the belt comprising two cross plies, each made of parallel hybrid cords,
each said hybrid cord comprising a core consisting of aramid strands twisted together in a first direction and an outer layer consisting of steel strands twisted around the core in a second direction which is reverse to the first direction,
each said aramid strand consisting of yarns twisted together in the second direction, each said yarn consisting of aramid fiber filaments twisted together in the first direction,
each said steel strand consisting of a steel monofilament, the aramid fiber filaments being resin-coated to hinder the transfer of humidity from the aramid strands to the steel strands.

2. The pneumatic tire according to claim 1, wherein the total denier number of all the aramid fiber filaments in each cord is in the range of from 800 to 4000 deniers.

3. The pneumatic tire according to claim 1, wherein the diameter of the steel monofilament is in the range of from 0.17 to 0.35 mm.

4. The pneumatic tire according to claim 1, wherein the total denier number of all the aramid fiber filaments in each cord is in the range of from 800 to 4000 deniers, and the diameter of the steel monofilament is in the range of from 0.17 to 0.35 mm.

5. The pneumatic tire according to claim 1, wherein each of said steel strands has a twist pitch in the range of 9.8 to 16 mm, and each of said aramid strands has a twist number in the range of 10 to 50 turn/10 cm.

* * * * *